United States Patent [19]

Holly

[11] 4,043,728
[45] Aug. 23, 1977

[54] MOLDING APPARATUS
[75] Inventor: Harry H. Holly, Boca Raton, Fla.
[73] Assignee: Hollymatic Corporation, Park Forest, Ill.
[21] Appl. No.: 737,434
[22] Filed: Nov. 1, 1976

Related U.S. Application Data

[63] Continuation of Ser. No. 619,848, Oct. 6, 1975, abandoned.

[51] Int. Cl.² .............................................. A22C 7/00
[52] U.S. Cl. .................................. 425/256; 425/544; 17/32; 425/555; 425/557
[58] Field of Search .................... 425/242 R, 256, 244, 425/261, 317, 412, DIG. 200; 17/32

[56] References Cited
U.S. PATENT DOCUMENTS

| | | | |
|---|---|---|---|
| 3,347,176 | 10/1967 | Hall | 107/4 |
| 3,623,188 | 11/1971 | Holly | 17/32 |
| 3,905,735 | 9/1975 | Thomas et al. | 425/256 |

Primary Examiner—Richard B. Lazarus
Attorney, Agent, or Firm—Wegner, Stellman, McCord, Wiles & Wood

[57] ABSTRACT

Apparatus for pressure molding a shaped article such as a food patty from moldable food material comprising a supply means such as a hopper for the material, a pressure chamber, a movable ram in the pressure chamber to pressurize the material therein, a receiver chamber such as a cylinder communicating with the pressure chamber to receive the pressurized material, a wall member such as a piston movable in the receiver chamber displaced by the force of the material entering thereinto, a mold having a mold opening adapted to register with the material in the receiver chamber, and mold filling means for forcibly moving this wall member to apply pressure to the material in the receiver chamber thereby forcing the moldable material into the mold opening.

5 Claims, 7 Drawing Figures

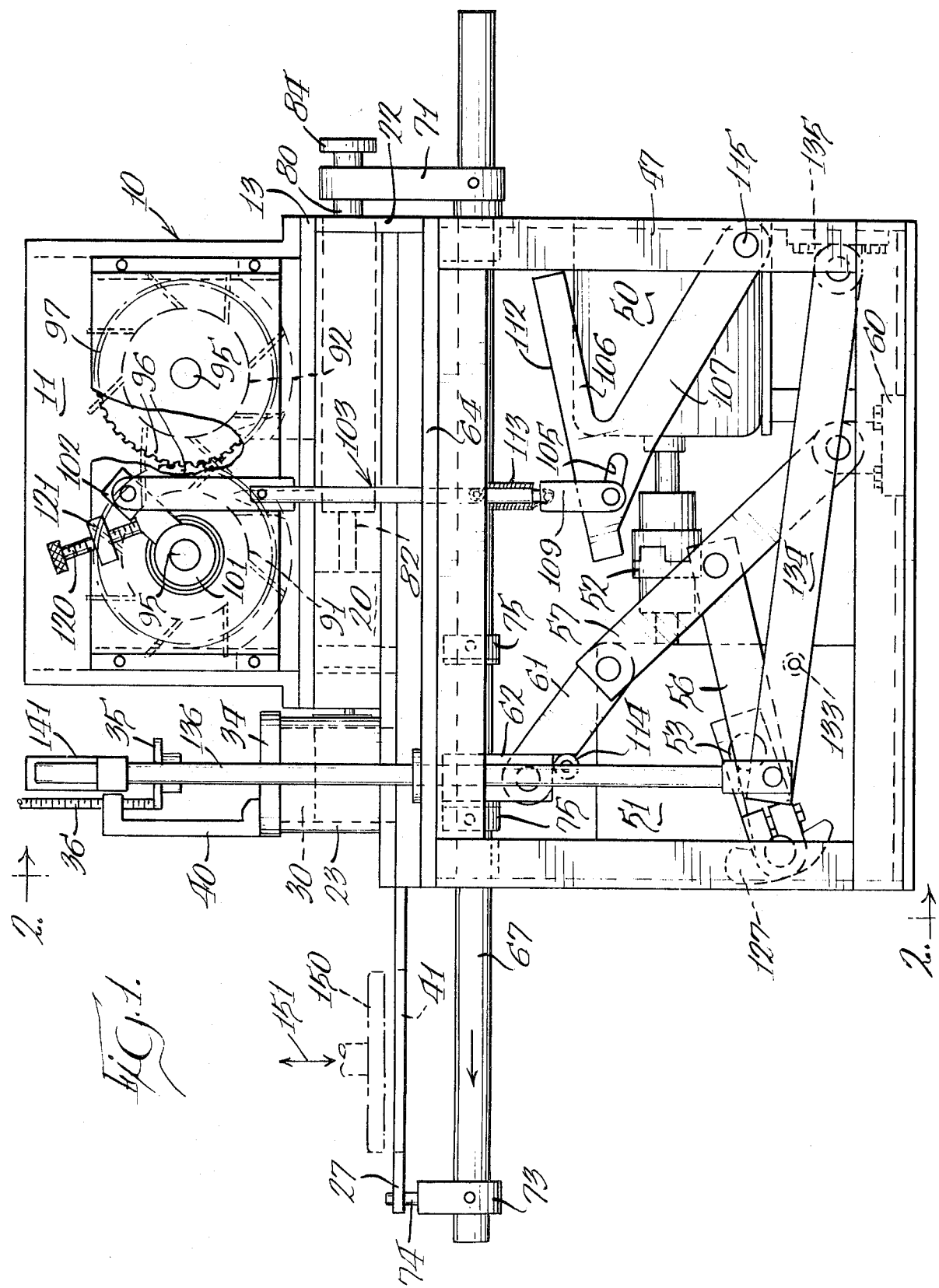

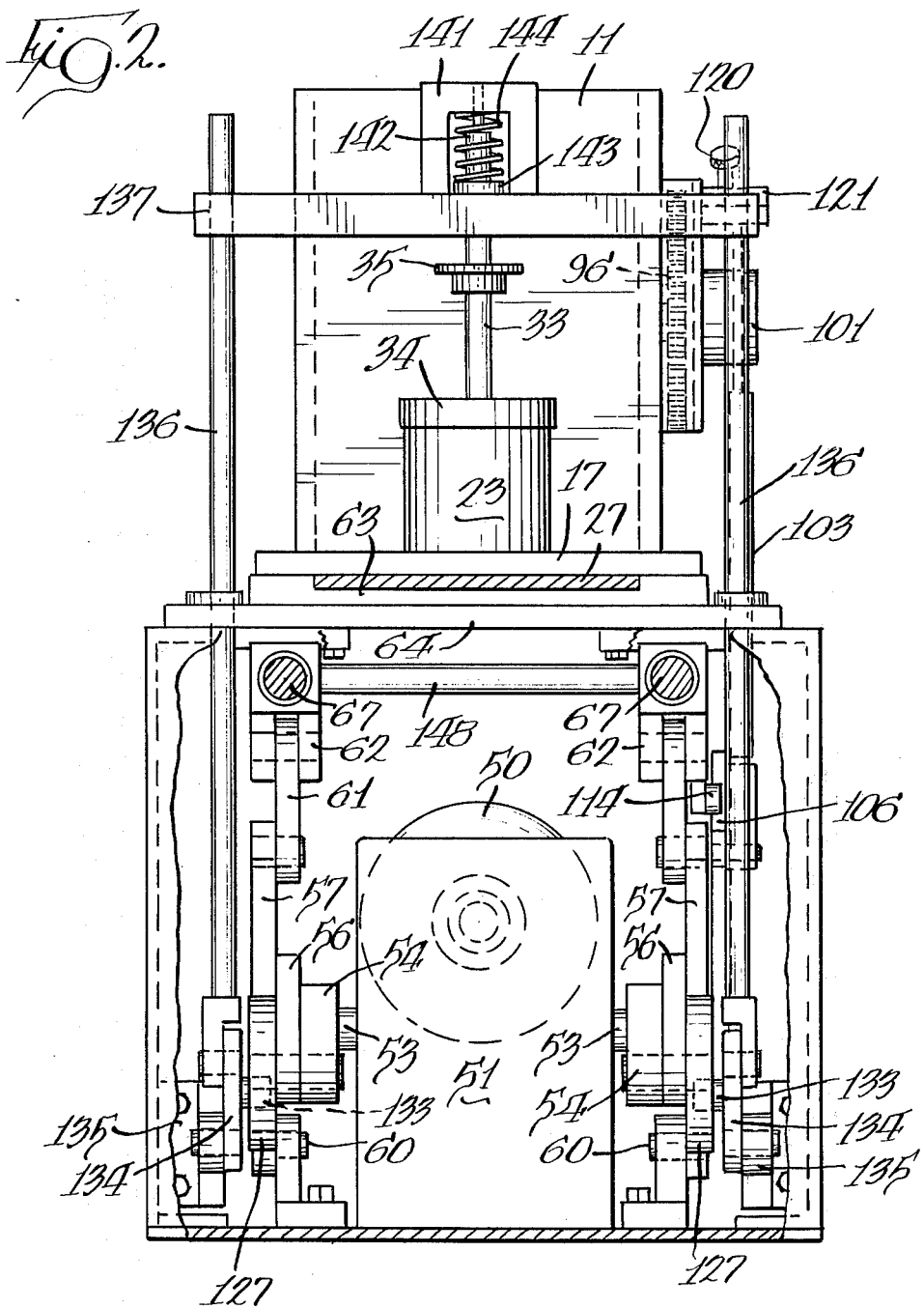

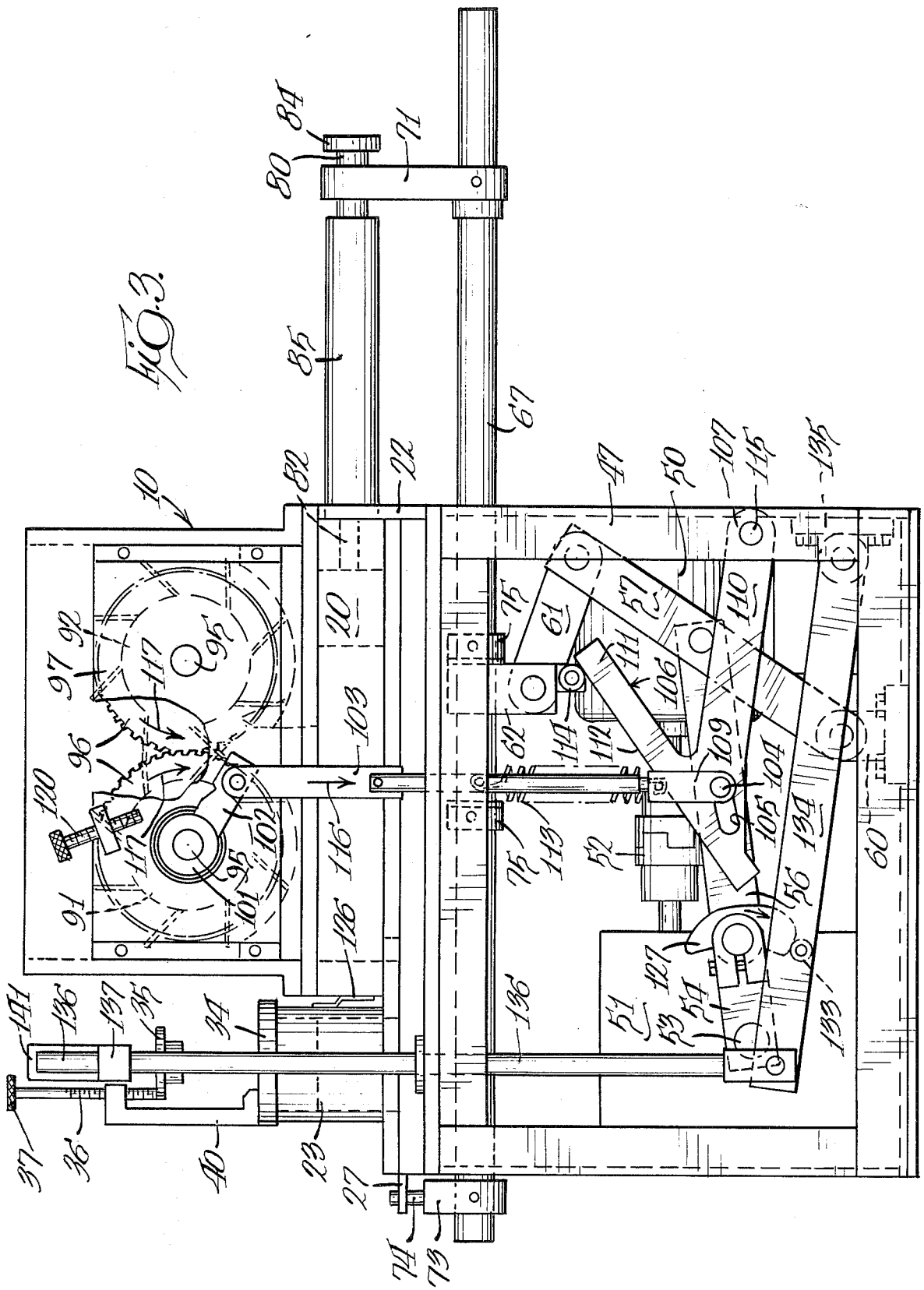

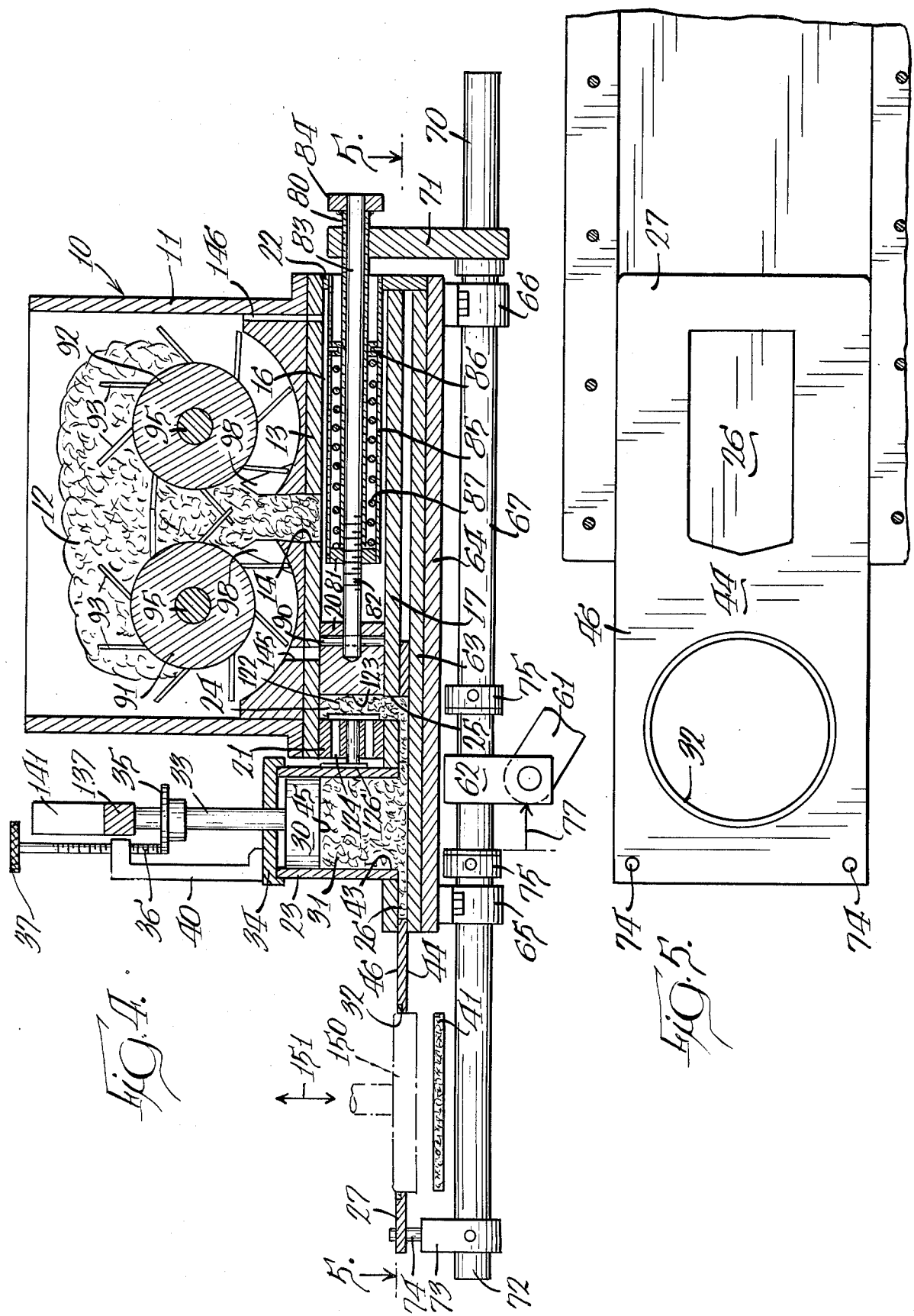

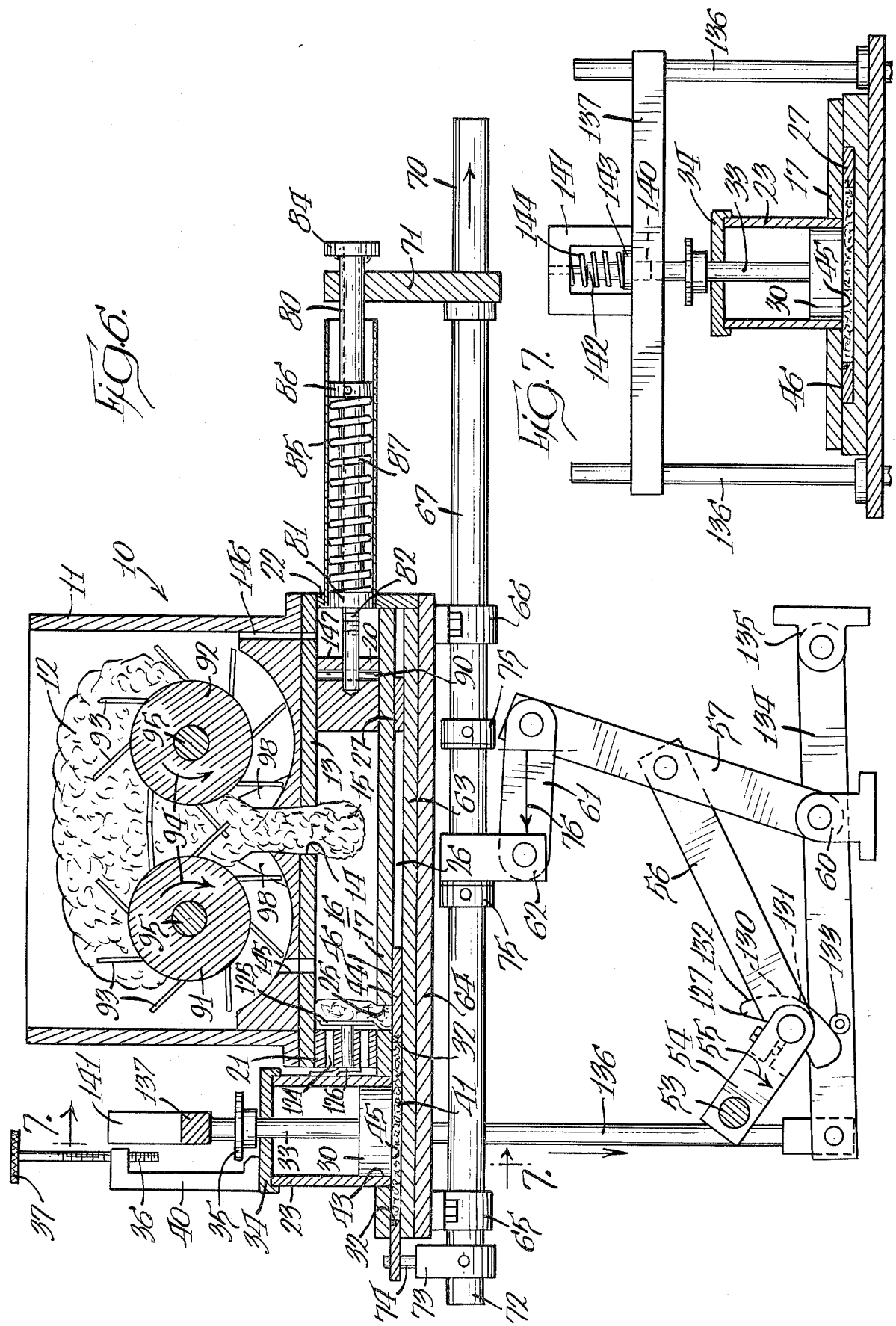

MOLDING APPARATUS

This is a continuation of application Ser. No. 619,848 filed Oct. 6, 1975, and now abandoned.

BACKGROUND OF THE INVENTION

This invention relates to an improved apparatus for pressure molding a shaped article such as a hamburger patty from a tissue containing food material such as ground raw beef that is subject to shrinkage during cooking. The apparatus provides a supply of the material, a receiver chamber such as a cylinder, a piston in the receiver chamber that is positioned away from the mold plate to provide space for a preselected amount of the material between the piston and the mold plate opening, mold filling means for forcibly moving the piston to apply pressure to the material in the receiver chamber thereby filling the mold opening, the piston having a pressure applying end that is substantially flush with the mold plate at the completion of the filling, means for thereafter moving the mold and thereby the mold opening to a position where the mold opening is out of communication with the cylinder and where the article is ejected from the mold opening and means for maintaining the piston substantially flush with the mold during this moving thereby maintaining the molding pressure on the material in the mold opening. The result is a meat-to-meat shear between the material in the mold opening and meat in the cylinder is avoided thereby preventing parallel alignment of the tissues and resulting nonuniform shrinkage. Because the apparatus of this invention avoids this parallel alignment of the tissues the articles such as a food patty maintains its uniform shape during shrinkage caused by cooking.

The most pertinent prior art of which applicant is aware is R. G. Hall U.S. Pat. No. 3,347,176 which also discloses a supply means, a cylinder and piston, a passage leading from the supply means to the cylinder and means for forcing the material from the cylinder into a mold plate opening by moving the piston toward the opening. However, the present invention has structure and advantages that are different from anything disclosed in this Hall patent as defined in the claims hereof.

BRIEF DESCRIPTION OF THE DRAWINGS

FIG. 1 is a side elevational view of a food material patty molding apparatus embodying the invention.

FIG. 2 is a sectional view taken substantially along line 2—2 of FIG. 1.

FIG. 3 is a view similar to FIG. 1 but showing the movable portions of the apparatus in positions opposite to those of FIG. 1.

FIG. 4 is a longitudinal fragmentary vertical sectional view through the top portion of the apparatus of FIG. 1.

FIG. 5 is a horizontal sectional view taken substantially along line 5—5 of FIG. 4 and illustrating primarily the mold plate and surrounding structure.

FIG. 6 is a view similar to FIG. 4 but showing the parts of the upper portion of the apparatus in rearwardly retracted position from the forward position of FIG. 4.

FIG. 7. is a fragmentary vertical sectional view taken substantially along line 7—7 of FIG. 6.

DESCRIPTION OF A PREFERRED EMBODIMENT

The molding apparatus 10 of the illustrated embodiment comprises a hopper 11 that comprises a supply means for the moldable material 12 such as finely divided food material. At the bottom of the hopper there is positioned a horizontal bottom plate 13 in which is located a transverse opening or slot 14 for projecting a preselected amount 15 of material 12 into a pressure chamber 16 that is defined by the space between the bottom plate 13 and a parallel plate 17 spaced thereebeneath.

Mounted for reciprocating forward and rearward movement between the plates 13 and 17 and thus in the pressure chamber 16 is a horizontal ram 20 of vertically rectangular cross section. The horizontal extremes of the pressure chamber 16 are defined by a front wall 21 and a rear wall 22 and forward of the front wall 21 is a receiver chamber vertical cylinder 23 that communicates with the pressure chamber 16 in the space 25 thereof forwardly of the forwardmost position of the ram 20 as illustrated in FIG. 4.

As illustrated in FIGS. 4 and 5 this communication is by way of a bottom transverse slot 25 in the plate 17 forwardly of the forwardmost position of the ram 20 which is the position illustrated in FIG. 4 with this slot 25 then communicating with an elongated passage 26 in an elongated mold plate 27 that is reciprocated between a forwardmost position of FIG. 4 and a rearwardmost position of FIG. 6.

This fill passage 26 when the mold plate is in the retracted position communicates with the bottom of the cylinder 23 in the space beneath a vertically movable piston 30 therein. Thus the ram pressurized material 31 which extends from the pressure chamber space 24 through the slot 25 and the fill passage 26 is under sufficient pressure to raise the substantially freely movable piston 30 to the elevated position shown in FIG. 4. The amount of pressurized material 31 beneath the piston 30 is preferably just sufficient to fill a mold opening 32 in the mold plate when the piston 30 is forced to its lowermost position as shown in FIG. 6 by means described hereinafter.

The piston 30 is basically a movable wall member that is movable in the cylinder that functions as a receiver chamber. Then, when the movable mold 27 has been moved to the filling position of FIG. 6 the piston is forcibly moved toward the mold opening to apply pressure to the material in the receiver chamber thereby forcing the material into the mold opening.

In order to predetermine the amount of material received in the cylinder 23 beneath the piston 30 the piston is provided with an upwardly extending stem 33 that extends through the top 34 of the cylinder and the stem 33 carries on its upper end a flat collar 35. This collar 35 in combination with an adjustable stop 36 preselects and determines the extent of upward movement of the piston 30 and thus the amount of material 31 received in the cylinder 23. This stop, in this embodiment, comprises an adjustable vertical screw having an adjusting knob 37 on its upper end and held in a vertical bracket 40 that is mounted on the top 34 of the cylinder. This adjustable stop 36 provides for variable amounts of pressurized material 31 in the cylinder 23 depending upon the size of the shaped article desired. Thus in the illustrated embodiment where the article is a flat patty 41 of food material such as ground meat, fish and the like the adjustment will be of course to position the piston 30 closer to the mold plate 27 for a 2 ounce patty, for example, and further away for patties of larger size.

The fill passage 26 therefore comprises a supply passage for flow of material between the pressure chamber space 24 and the receiver chamber space which is the portion of the cylinder 23 beneath the vertically movable piston 30. The open bottom end 43 of this cylinder 23 adjacent the mold plate 27 likewise comprises a flow passage for flow of material from the receiver chamber or cylinder 23 to the mold opening 32.

The mold 27 also includes a barrier portion 44 that is located between the fill passage 26 and the mold opening 32 for blocking the flow passage 26 in the bottom plate 17 when the mold has moved the mold opening 32 into filling position as shown in FIG. 6.

In the illustrated embodiment the flow passage 43 from the receiver chamber cylinder 23 to the mold opening 32 has a transverse area that is less than that of the mold opening 32. This is particularly advantageous when molding food material such as raw ground beef that contains tissue and similar fibers and that requires later cooking. This is an advantage because unless this tissue is arranged in other than parallel patterns the cooking and similar processing tends to cause the molded article such as a circular patty to shrink nonuniformly so that a distorted shaped product is produced. By having the mold opening with a transverse area larger than that of the flow passage 43, however, the tissue is arranged generally radially so that during cooking and resultant shrinking the circular patty maintains its circular though smaller shape.

In connection with FIG. 6, it should also be noted that the flow passage 43 from the cylinder 23 is of substantially the same transverse area as the interior of the cylinder 23 so that the material 31 flows smoothly from beneath the piston 30 into the mold opening. This is a particular advantage in the molding of a food material such as ground raw beef as it avoids excessive working of the material which tends to squeeze out the juices and toughen the cooked food material so that there is not only deterioration in texture causing the meat to be tougher but also a great reduction in flavor because of the expelling of the juices.

In fact, this invention is particularly adaptable to molding such food material as ground raw beef because it does avoid excessive working of the material which tends to expel the juices and toughen the product and reduce its flavor and it also avoids aligning any tissues in parallel patterns which, as noted above, causes uneven shrinkage during cooking.

When the piston 30 has been moved downwardly to the lowered position shown in FIG. 6 to fill the mold opening 32 and produce the resulting patty 41 the bottom surface 45 of the piston 30 is substantially flush with the top surface 46 of the mold plate 27.

The bottom part 47 of the apparatus 10 is provided with the motor drive for the apparatus. This comprises an electric motor 50 that drives a gear reducer 51 through a shaft coupler 52. Extending from the opposite sides of the reducer 51 are aligned power shafts 53 of which only one is shown in the drawings but with the shaft on the opposite side being exactly the same. Each of these oppositely located shafts 53 drives a lever system that includes a short link 54 rotatable in a clockwise direction 55 as viewed in FIG. 6, with this link being rotatably connected to one end of a second link 56 whose opposite end is rotatably connected to about the midpoint of a third link 57. The lower end of this third link 57 is fulcrumed on a mounting bracket 60 while the upper end of this third link 57 is hingedly connected to a fourth link 61 whose other end is hingedly connected to a slide block 62.

As noted above, although only one set of linkages and slide block are shown on the one side of the apparatus illustrated, there is a corresponding set on the opposite side of the apparatus.

The mold plate 27 slides between the previously described plate 17 and a bottom plate 63 which is supported by a plate 64. Mounted on this plate 64 at each end of the apparatus is a slide bracket 65 and 66 with another pair of exactly similar brackets provided on the opposite side of the apparatus. Each pair of brackets 65 and 66 slidably supports a drive rod 67. There are thus provided two of these drive rods 67 in parallel arrangement on opposite sides of the apparatus. The rear end portions 70 of the rods have extending between them a transverse drive bracket 71 and mounted on the forward end 72 of each slide rod 67 is a mold plate drive block 73 that is connected to the forward end of the mold plate by an upwardly projecting pin 74 on each side of the mold plate.

Each slide block 62 slides on its drive rod 67 in a path that is defined by a pair of spaced drive collars 75. These collars provide a lost motion connection between the slide blocks 62 and the drive rods 67. Thus when each block 62 is against the forwardmost collar 75 as shown in FIG. 6 and the shafts 53 are rotating as indicated at 55 the rods 67 are moved forwardly as shown by the arrow 76 in FIG. 6. However, when the rotation of the gear reducer shafts 63 and the linkage systems connected thereto moves the slide blocks 62 rearwardly as indicated by the arrow 77 in FIG. 4 the slide blocks 67 and the portions of the structure attached thereto do not begin their rearward movement until the slide blocks 62 reach the rear drive collars 75.

The drive bracket 71 in its reciprocating movement between the extreme positions of FIGS. 6 and 4 drives a sleeve 80 that extends through the rear wall 22 of the pressure chamber 16 to engage a threaded nut 81 that is spaced a short distance rearwardly of the ram 20. This nut 81 engages the threaded forward end 82 of a shaft 83 that is located within the sleeve 80. This shaft 83 is rotatable by turning a head 84 attached thereto rearwardly of the drive bracket 71.

Concentrically around and spaced from the sleeve 80 is a horizontal cylinder 85 that is slidable in the rear wall 22 and this cylinder at its forward end surrounds the threaded nut 81. Fastened to the interior of the cylinder 85 and spaced from the nut 81 is an annular collar 86. Positioned between this collar 86 and the nut 81 is a helical spring 87 that is located in a space between the sleeve 80 and the cylinder 85. The nut 81 is slidable within the forward end of the cylinder 85 and because it is fastened to the sleeve 80 which is itself fastened to the head 84, turning the shaft 83 adjusts the position of the nut 81 longitudinally and thus adjusts the precompression of the helical spring 87. The forward end of the shaft 83 is attached to the ram 20 by a cross pin 90.

The head or handle 84 may thus be used to adjust the compression on the spring 87. If the handle 84 is turned in a clockwise direction as viewed from the rear it draws the nut 81 toward it on the threaded forward end 82 of the shaft 83 which nut 81 is slidable on the interior surface of the cylinder 85. Conversely, rotating the head 84 in a counterclockwise direction moves the nut 81 further away and reduces the compressive force on the spring 87. In making these adjustments the handle or head 84 rotates freely on the shaft 83. The precompression thusly applied to the spring 87 presses the end collar 86 firmly against the drive bracket yoke 71 as the collar 86 is pinned securely to the cylinder 85 by three screw pins as illustrated.

In order to feed material from the hopper 11 into the pressure chamber 16 there are provided a pair of cylindrical feeders 91 and 92 each provided with spaced pins 93 sloped in the directions of rotation as shown by the arrows 94. These feeders 91 and 92 are mounted on cross parallel shafts 95 above and on opposite sides of the opening 14 into the pressure chamber 16 and when the feeders are rotated the pins which move from the top toward each other project a vertical column of material through the opening 14 to provide the depending amount 15 of material. In order to prevent the material being carried around by the rotating pins 93 there are provided combs 98 on opposite sides of the slot exit opening 14 with each comb comprising teeth spaced apart slightly greater than the width of a pin 93 so that the passage of the pins through the combs 98 will tend to strip material carried by the pins.

The feeders 91 and 92 are provided with intermeshing circular gears 96 concentric with the shafts 95 with these gears being concealed behind a front wall 97. These gears rotate the feeders in the directions 94 intermittently with each reciprocation of the drive rods 67. This intermittent rotation is accomplished in the following manner.

One of the pair of parallel shafts 95 has mounted thereon a one-way clutch 101 having a projecting arm 102. This clutch permits rotation of the shaft 95 to which it is attached only in a clockwise direction as viewed in FIG. 3. Because of the meshing of the gears 96 this of course causes rotation of the opposite shaft 95 only in a counterclockwise direction.

Attached to the outer end of the clutch arm 102 is a depending vertical drive member 103 whose lower end 109 carries a stub shaft 104 which projects inwardly to engage an elongated slot 105 in a cam plate 106.

This cam plate is of generally bifurcated construction with one end 107 of a branch 110 hingedly connected to the bottom portion 47 of the apparatus and the other branch 111 providing an inclined cam surface 112. As can be seen from FIGS. 1 and 3 the slot 105 in which is located the stub shaft 104 is positioned adjacent to the area of joining of the angular branches 110 and 111.

A helical spring 113 is provided having an upper end attached to the frame of the apparatus and a lower end attached to an end portion 114 of the vertical drive member 103 in order to constantly urge the drive member and thus the clutch arm 102 and cam 103 in an upward direction.

In order to apply pressure to the cam surface 112 and urge it and thus the drive member 103 and clutch arm 102 downwardly a slide block 62 carries a depending cam follower roller 114. When the mold plate and the mold plate drive are in the forwardly projected position as shown in FIG. 1 the slide blocks 62 and the roller 14 are likewise in their forwardmost positions. Then movement of the slide blocks 62 toward their rearwardmost position of FIG. 3 carries the cam follower roller 114 rearwardly to engage the inclined cam surface 112 and depress the cam plate 106 downwardly about its hinge 116 connection to the bottom part 47 of the frame of the apparatus as shown in FIG. 3.

This arrangement of the cam roller 114 causes the counterclockwise arcuate movement of the cam plate 106 to pull the drive member 103 downwardly as indicated at 116 thereby turning the clutch 101 clockwise and because of the intermeshing gears 96 turning the feeders toward each other as shown by the arrows 117 in FIG. 3. This indexes the feeder pins toward the opening 14 between the hopper 11 and the pressure chamber 16 to project the material 15 into the pressure chamber. Then, when the forward movement of the drive mechanism and the mold plate begins the forward movement of the slide blocks 62 carries the cam follower roller 114 forwardly to release the cam 106 thereby permitting the spring 113 to raise the cam 106 to its elevated position of FIG. 1 and to return the clutch arm 102 to its elevated position against an adjustable stop 120. The adjustable stop 120 which as shown in this embodiment is an elongated screw threadably engaging a bracket 121 adjusts the upward position of the clutch arm 102. This upper or retracted position of the clutch arm 102 and thereby the clutch 101 predetermines the amount 15 of material projected into the pressure chamber 16. Obviously, the higher the position of the clutch arm 102 the greater the arcs of movement of the feeders 91 and 92 and the greater the volume of material 14 that is moved into the pressure chamber.

In reciprocating the ram 20 rearwardly from the forward position of FIG. 4 toward the retracted position of FIG. 6 it sometimes occurs that the suction of the retracting ram pulls the portion 122 of material at the front surface 123 of the ram rearwardly with the ram. In order to prevent this a vacuum release venting means is provided. This release means comprises a plurality, here shown as four, of holes 124 through the front wall 21 of the pressure chamber 16 and a normally open flat valve plate 125 encompassing these holes. The plate 125 is within the space 24 at the forward end of the pressure chamber and the plate is held in the normally open position of FIG. 6 by a leaf spring 126. With this arrangement the leaf spring 126 normally holds the valve plate 125 spaced from the opening 124. However, the advancing material pressed forwardly by the ram 20 engages and closes this valve plate so that the pressurized charge of material cannot escape through the opening. Then when the ram moves to the rear or from the position of FIG. 4 to the position of FIG. 6 suction developed at the front face of the ram opens the valve to permit air to enter and relieve this suction.

The pair of short or first links 54 which are rotatable with the oppositely projecting drive shafts 53 carries on their outer ends at the hinge connection to the two links 56 a crescent cam 127. Each cam 127 has an arcuate cam surface 130 that at its forward end with relation to the direction of rotation 55 and for most of the extent of the surface 130 is concentric with the axis of rotation of the shaft 53. This forward portion 131 of the cam surface arcuately curves toward the axis of rotation at its rear portion 132 as shown most clearly in FIGS. 3 and 6.

These cam surfaces 130 each engage a roller 133 that acts as a cam follower with each roller being mounted on a generally horizontal drive bar 134. Each drive bar has a rear end fulcrumed to a mounting bracket 135 and its forward end hingedly connected to the bottom of a vertical drive bar 136. The two drive bars are vertical and substantially parallel to each other and carry at their upper ends above the cylinder 23 a cross bar 137. The cross bar 137 has a central opening 140 into which extends the upper end of the piston 30 stem 33. Located above this opening 140 is an enclosing bracket 141 in which is located a vertically movable stub shaft 142 that is urged downwardly to press a collar 143 against the top of the cross bar 137 by a helical compression spring 144. This spring 144 and associated structure limits the amount of downward force that can be exerted on the material 31 within the cylinder 23 by the descending piston 30.

When the apparatus is properly adjusted the ram 20 is moved forwardly to project the amount of pressurized material 31 beneath the piston 30 to exactly fill the mold opening 32. If, however, through maladjustment too much material is transferred to the pressure chamber 16, as indicated for example at 15, the upward movement of the piston 30 being stopped by the stop 36 at that amount necessary to fill the mold opening means that the excess will gradually accumulate in front of the front surface 123 of the pressure ram. This accumulation 122 gradually builds up because the amount of material that can enter beneath the piston 30 is limited by the collar 34 and stop 36. When the accumulation reaches a certain amount, the pressure ram 20 is held rearwardly from its position in FIG. 4 to expose an upwardly extending vent slot 145 leading from this portion of the pressure chamber up to the interior of the hopper 11 rearwardly of the adjacent comb 98. Because this passage 145 is so short even when the apparatus is thus maladjusted the forcing of the excess material back into the hopper is this manner does not excessively work and does not toughen the meat. On the opposite end of the pressure chamber 16 there is provided a second vent slot 146 that provides a return passage for material that leaks to the rear of the ram. This material is compressed by the rear face 147 of the ram 20 and forced up the slot 146 again to a portion of the hopper that is rearwardly of the adjacent comb 98. This slot 146 like the first slot 145 returns the material without excess working which in the case of meat is important in order to prevent toughening of the meat and reducing its flavor for the reasons previously described.

When the mold plate 27 is in its forwardmost position in the embodiment illustrated the formed patty 41 is removed from the opening by a knockout mechanism that includes a vertically movable cup 150 that is reciprocated in a vertical direction as shown by the arrow 151 into and out of the mold opening 52 during the pause in the movement of the mold plate due to the lost motion connection provided by the spacing of the drive collars 75 on opposite sides of each slide block 62. The knockout mechanism including the cup 150 and apparatus for moving it in a vertical direction 151 may be any of these customarily used and widely known. Examples of such knockout or patty removing apparatus are shown and described in U.S. Pat. Nos. 3,293,688 and 3,417,425, both assigned to the assignee hereof.

The operation of the apparatus in the disclosed embodiment is believed obvious from the above description. However, a brief summary of the operation is as follows.

The motor or gear reducer rotate the opposite drive shafts 53 in the direction indicated to reciprocate the slide blocks 62 on their drive rods 67. This reciprocates the mold plate 27 between the rearwardmost position of FIGS. 3 and 6 and the forwardmost position of FIGS. 1 and 4. When the mold plate and the drive mechanism which drives it are in their forwardmost positions as shown in FIGS. 1 and 4 the knockout structure 150 is reciprocated vertically 152 into and out of the mold plate opening 32 to remove the patty 41 therefrom.

Because the drive rods 70 and drive bracket 71 interconnect the mold plate 27 and the ram 20 these move simultaneously in the same direction. Because of the location of the fill passage 26 in the mold plate when the mold opening 32 is in position for removal of the patty 41 as described the fill passage 26 interconnects the bottom of the pressure chamber fill slot 25 and the bottom end 43 of the cylinder 23. This causes the ram 20 to force the pressurized material 31 through the slot 25 and up into the cylinder to raise the piston 30 to the point where the collar 35 engages the stop 36. This predetermines the amount of pressurized material 31 beneath the piston and when the apparatus is properly adjusted this amount will be exactly that required to fill the mold opening 32 to produce the shaped patty 41.

Then rearward movement 77 of the drive portions of the apparatus cause the slide blocks 62 to engage the rear drive collar 75 when the knockout cup 150 has been raised from the mold opening 32. Continued rearward movement of the slide blocks 62 retracts the ram 20 to the position shown in FIG. 6 and in this completely retracted position and the mold opening 32 is directly and concentrically beneath the cylinder 23. The rotation 55 of the links 54 causes the cam surface forward portion 131 to engage the cam follower roller 133 on each side of the apparatus and pull the piston 30 down sharply to the position where the bottom surface 45 is flush with the top surface 46 of the mold plate. Because of the coaxial relationship of the leading cam surface 131 of the cam 127 the piston is held in this position until the forward movement 76 of the linkage system causes the slide blocks 62 engaging the forward drive collar 75 to again move the ram and mold plate to the position shown in FIG. 4.

During the time that the piston 30 is being depressed to the position shown in FIG. 6 to fill the mold opening 32 the barrier portion 44 of the mold plate is beneath the slot 25 leading from the forward end of the pressure chamber so that no more material can flow therethrough while the mold opening is being filled.

The continued rotation of the cam 127 permits release of the downward pressure on the piston 30 but this is only after the mold opening 32 has been moved out of position beneath the cylinder 23

As previously stated, the incoming pressurized charge 31 of material raises the piston 30 to its uppermost position as shown in FIG. 4. At the same time the tension of the spring 113 pulls the drive member 103 and the cam plate 106 to their elevated positions shown in FIG. 1 with the clutch bar 102 against the stop 120. This upward movement of these parts of the apparatus does not cause any movement of the feeders 91 and 92 because of the provision of the one-way clutch 101.

Then rearward movement 77 of the slide block 62 and corresponding rearward movement of the cam follower roller 114 causes the engagement of the follower with the cam edge 112 to depress the cam plate 106 and index the feeders downwardly arcuately as indicated by the arrows 117 to provide a fresh charge of moldable material in the pressure chamber 16.

In the operation of the machine the amount of moldable material 12 such as ground beef to form the molded article such as the beef patty 41 is easily predetermined by adjusting the position of the stop 120 which determines the upward position of the clutch arm 102. This in turn determines the amount of material that will be captured by the feeder pins 83 so that the cam 106 operated feeder drive member 103 will project the exact amount of material into the compression chamber 16 for forming one molded article or patty 41 when the piston 30 has been pulled down as described to its lowermost position of FIG. 6 wherein its bottom 45 is flush with the top of the mold plate 27. This relationship is illustrated in both FIGS. 6 and 7.

The amount of material 15 necessary to form the molded article 41 is not immediately pressed into the cylinder 23 to provide the portion 31 shown in FIG. 4 which is the exact amount of the portion 15 and the exact amount in the patty 41 but, first, the projected amount 15 is forced forwardly in the compression chamber by the advancing ram 20 as it reaches the position shown in FIG. 4 and this amount is then moved into the rear end fill passage 26 where it displaces an equal amount of material upwardly to form the portion 31 beneath the piston 30 which in this embodiment is raised to this elevated position by the pressure of the incoming material 31. Thus with each reciprocation of the ram 20 forwardly to feeding position the amount of material required to produce the article 41 is forced into the fill slot and eventually up into the area beneath the ram 30 in successive portions.

If the apparatus is maladjusted any excess amount over that required to produce a patty 41 is automatically compensated for because this excess amount on successive strokes of the ram 20 builds up to the point where the ram is held retracted by the excess material to where the bypass slot 145 is exposed and the excess begins to be returned to the hopper 11 in the manner previously described. If the maladjustment provides too small an amount of material to produce the patty 41, it is immediately evident in the fact that unfilled patties will begin to be produced by the apparatus. This will immediately alert the operator to this condition and he can make the proper adjustments as by adjusting the position of the stop 120 until the condition is corrected. If he overadjusts so that too much material is fed into the compression chamber 16 for making a patty 41, this excess will be returned to the hopper through the passage 145 in the manner previously described.

The opposite vent slot 146 merely takes care of leakage around the ram so that close tolerances of the ram and selfadjusting seals are not required.

As is evident from the disclosure the molding apparatus of this invention can be used to mold any type of pressure moldable material that is self-sustaining once it has been molded. However, it is particularly adapted for making molded articles such as patties of food materials such as raw meat. The apparatus is particularly adapted for food material molding because it avoids shearing which tends to align any tissue in parallel so that during cooking the article such as the hamburger patties shrink out of round. Shearing is avoided by having the bottom 45 of the feed piston 30 substantially flush with the top 46 of the mold plate 27 as shown in FIGS. 6 and 7 so that there is no movement of one portion of meat relative to an adjacent portion as when the mold plate is moved to the patty ejecting position of FIG. 1. Similarly because the fill opening 14 is long and narrow the forward moving ram 20 which cuts off the depending portion 15 of material necessary to form a patty 41 is sheared but the area involved is so small that it has no material effect on the alignment of the tissue. Similarly, any aligned tissue that might prevail is immediately corrected by the forcing of the tissue containing meat first downwardly in the slot 25 as shown in FIG. 4 and then forwardly in the passage 26 and then upwardly beneath the ram 30.

The forcing of the tissue containing food material forwardly in the fill passage 26 also tends to cause an alignment of the tissue in parallel as it flows forwardly in the passage 26 and up into the space beneath the elevated ram 30. However, when the food material contains such tissue it is preferred that the diameter of the mold opening 32 be greater than the diameter of the open bottom flow passage 43 so that the descending piston 30 when forced from the raised position of FIG. 4 to the lowered position of FIG. 6 causes the tissue containing food material to first pass longitudinally downwardly and then radially outwardly to the periphery of the mold opening 32 and this combined longitudinally and radial movement destroys any parallel alignment of the tissues so that the resulting patty or similar article will shrink uniformly.

When used on food material such as meat which contains a mixture of fluids and solid particles the high quality of the material is maintained because the pressures employed by the apparatus of this invention are gentle so that the juices are not squeezed from the tissues and the resulting shaped articles such as patties are similar in texture and flavor to those shaped by the gentle pressure of hand molding.

Another feature that contributes to the high quality of the shaped article that is particularly important when the material is food is the fact that no air is trapped in the space beneath the piston 30 in the cylinder 23. This is true because the entire space between the forwardly pressed ram 20 as illustrated in FIG. 4 and the surface 45 of the piston 30 is completely filled with material at all times.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Apparatus for pressure molding a shaped article from a tissue containing food material subject to shrinkage during cooking, comprising: supply means for said material; a pressure chamber communicating with said supply means to receive material therefrom; a movable pressure applying means in the pressure chamber; a receiver chamber; means providing a supply passage for flow of material between said pressure chamber and said receiver chamber communicating with said pressure chamber to receive pressurized material from said pressure chamber; means for moving said pressure applying means in said pressure chamber for exerting pressure on said material and thereby forcing the resulting said pressurized material into said receiver chamber; a movable mold plate having a cavity mold opening for registering with the said material in said receiver chamber; means for moving said mold opening into communication with said receiver chamber; means providing for flow of material from said receiver chamber to said mold opening; a piston in said receiver chamber; means for positioning said piston away from said mold plate to provide space for a preselected amount of said material between said piston and said mold plate opening; mold filling means for forcibly moving said piston to apply pressure to the said material in said receiver chamber thereby filling said mold opening with said material, said piston having a pressure applying end that is substantially flush with said mold plate at the completion of said filling; means for thereafter moving said mold and thereby said mold opening to a position where said mold opening is out of communication with said receiver chamber whereat said article is ejected from said mold opening; and means for maintaining said piston substantially flush with said mold at said opening during said moving of said mold opening thereby maintaining molding pressure on said material in said opening.

2. The apparatus of claim 1 wherein said supply passage comprises a portion of said mold plate.

3. The apparatus of claim 2 wherein said mold plate comprises a barrier portion for periodically blocking said flow passage of said receiver chamber.

4. Apparatus for pressure molding a shaped article from a tissue containing food material subject to shrinkage during cooking, comprising: supply means for said material; a pressure chamber communicating with said supply means to receive material therefrom; a cylinder having an open end; a piston in said cylinder movable toward and away from said open end; a mold having a mold opening for registering with said open end to receive material therefrom; means for moving said mold and thereby the mold opening to a position where said mold opening is out of communication with said cylinder whereat said article is ejected from said mold opening; means for transferring material from said pressure chamber into said cylinder in one position of said mold; means for moving said piston toward the mold in a second position of said mold to project material from said cylinder into said mold opening; and cam means for both moving said piston toward said mold opening and then maintaining said piston substantially flush with said mold at said opening during said moving of said mold opening thereby maintaining molding pressure on said material in said opening.

5. The apparatus of claim 4 wherein there are provided adjustable stop means for limiting the extent of movement of said piston to define with said cylinder a material receiving space and predetermine the volume of material transferred into said space, the volume of said material receiving space being substantially equal to the volume of said mold opening.

* * * * *